UNITED STATES PATENT OFFICE.

JAMES ARTHUR PALETHORPE, OF LIVERPOOL, ENGLAND, ASSIGNOR TO THE TOBACCO WAREHOUSING AND TRADING COMPANY, OF DANVILLE, VIRGINIA.

SHEEP-DIP COMPOUND.

SPECIFICATION forming part of Letters Patent No. 594,753, dated November 30, 1897.

Application filed February 1, 1897. Serial No. 621,546. (No specimens.)

*To all whom it may concern:*

Be it known that I, JAMES ARTHUR PALETHORPE, a subject of the Queen of Great Britain, and a resident of Liverpool, in the Kingdom of Great Britain, have invented a new and useful Sheep-Dip Compound or Insecticide, of which the following is a specification.

My invention relates to an insecticide to be used in powdered form or a sheep-dip compound from which a sheep-dip or sheep-wash in liquid form is to be prepared by the user by making a decoction from said compound by the simple application of water thereto.

The principal ingredient of my improved article of manufacture is tobacco (*Nicotiana tabacum*) reduced in any suitable manner to an impalpable powder or to other finely divided or ground state, the parts of the tobacco used being the stems, ribs, midribs, or parenchyma of the leaves or other parts of the tobacco-plant, the powder being mixed with other ingredients comprising flowers of sulfur, ground hellebore, and ammoniated soda-ash.

The compound is sold to the user and is either applied in the dry state as an insect-powder or has water mixed therewith or applied thereto by the user to make a wash or dip. This dip is very effective in the cure or prevention of scab, foot-rot, maggots, mange, ticks, lice, fleas, &c., in sheep, horses, cattle, dogs, or other animals, and also as a wash and disinfectant for contagious or infectious diseases—such as foot and mouth diseases, cattle-fever, &c.

Hitherto dips or washes have been made by extracting tobacco in liquid form in order to have the nicotine present; but my present invention effects a great saving and involves very great convenience by preparing this material in powdered form and in such a powdered form as to enable the user to prepare the wash by simply adding water or to use the powder in dry state.

My compound is very cheaply prepared, inasmuch as it provides for using and puts into a state convenient for use the tobacco-stems and such other parts of the tobacco-leaf as are discarded when leaf is removed from the stems for its ordinary uses.

Having thus described my invention, the following is what I claim as new therein and desire to secure by Letters Patent:

A sheep-dip or insecticide consisting of a mixture of powdered tobacco, flowers of sulfur, ground hellebore, and ammoniated soda-ash; substantially as described.

J. ARTHUR PALETHORPE.

In presence of—
R. THOMPSON, Jr.,
I. A. PADLEY.